No. 632,152. Patented Aug. 29, 1899.
W. SCHAU.
TIRE TIGHTENER.
(Application filed Sept. 22, 1898.)
(No Model.) 3 Sheets—Sheet 1.
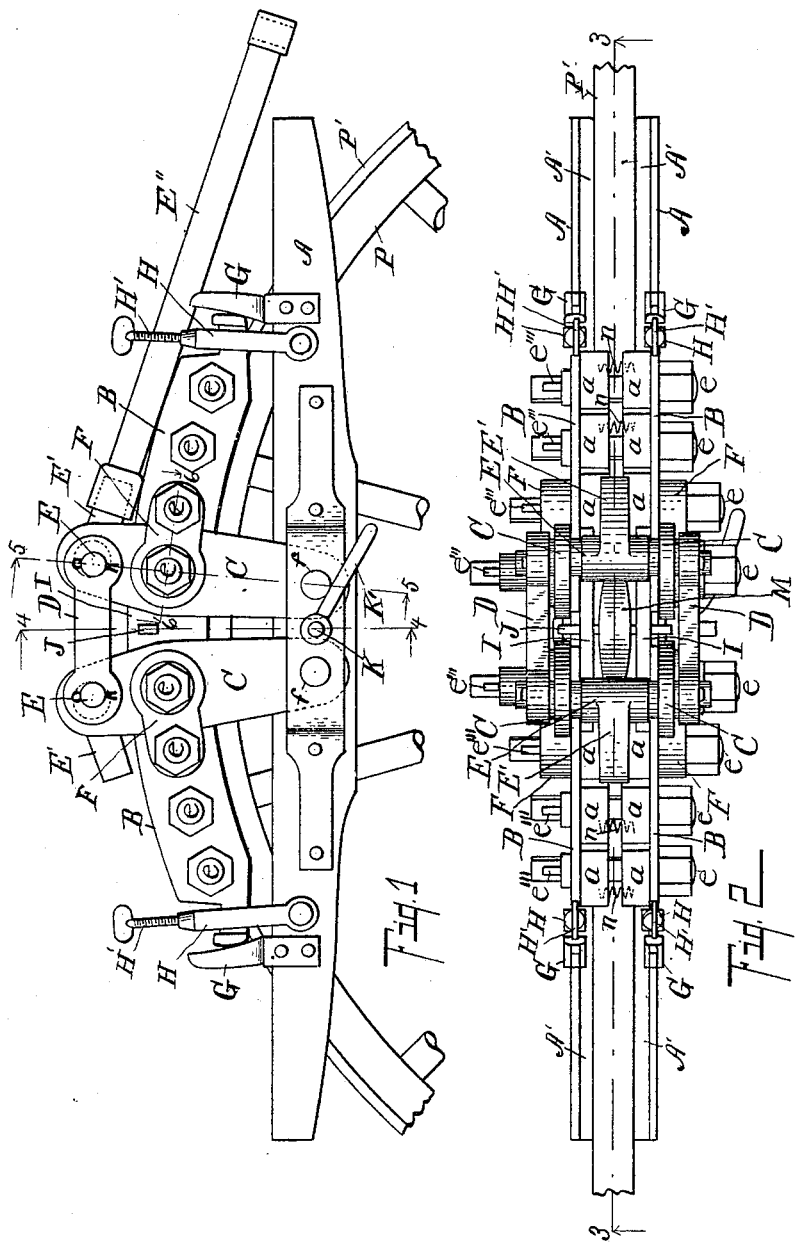
Witnesses:
Otis A. Earl
Vene E. Chappell
Inventor,
William Schau
By Fred L. Chappell
Att'y.

No. 632,152. Patented Aug. 29, 1899.
W. SCHAU.
TIRE TIGHTENER.
(Application filed Sept. 22, 1898.)
(No Model.) 3 Sheets—Sheet 2.
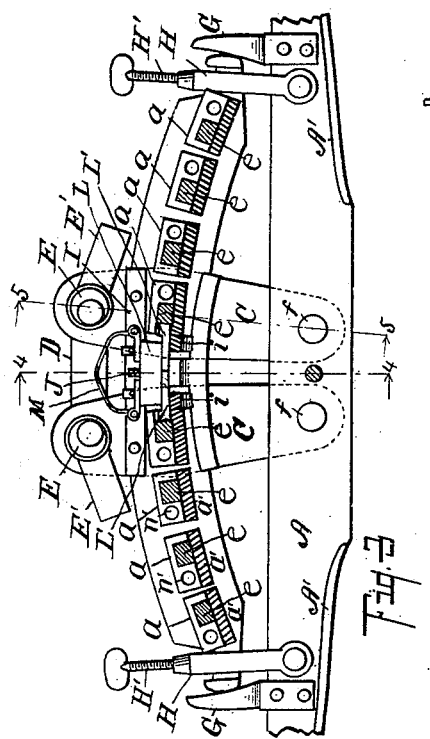
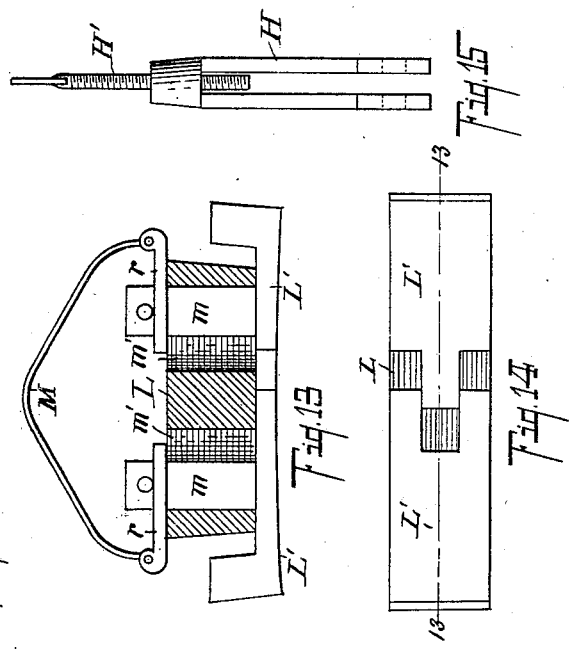
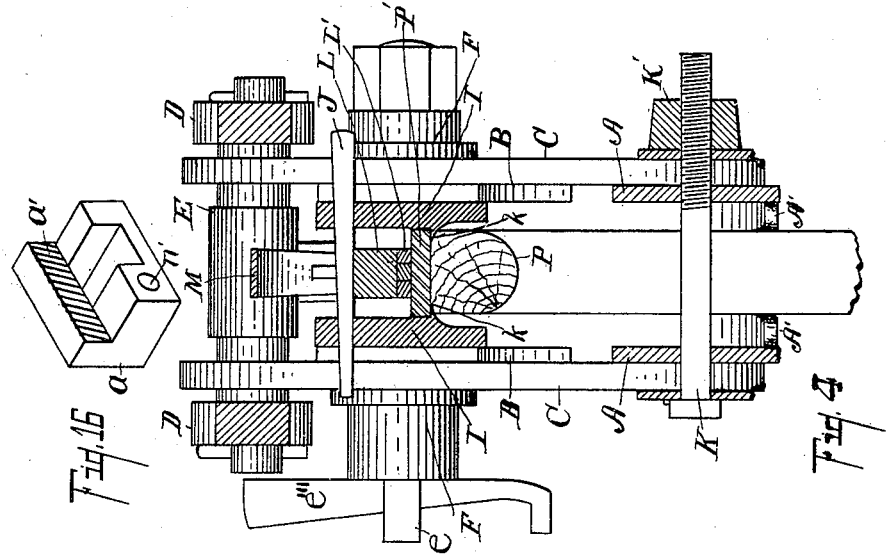
Witnesses:
Vin E Chappell
Otis A Earl
Inventor,
William Schau
By Fred L Chappell
Att'y.

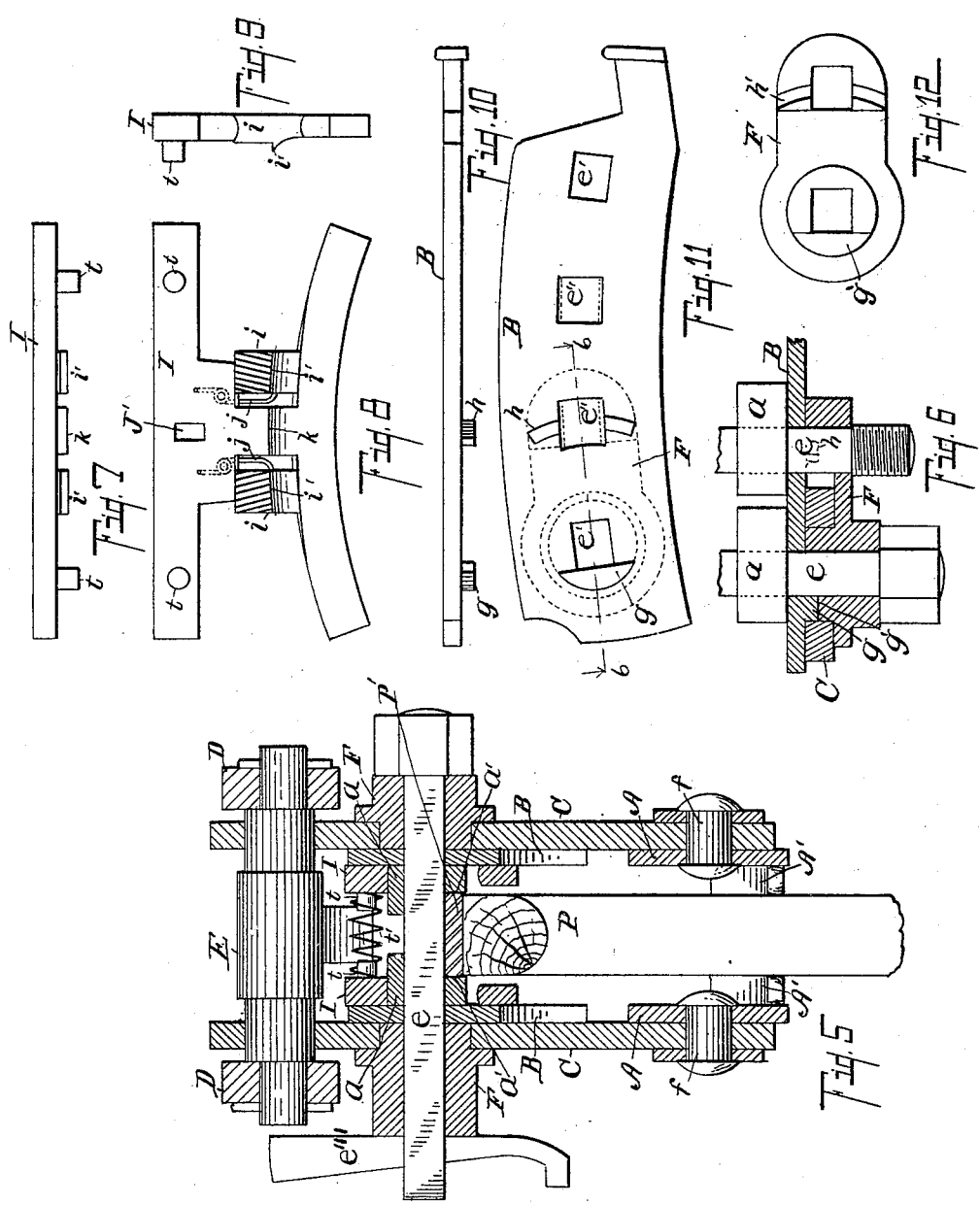

UNITED STATES PATENT OFFICE.

WILLIAM SCHAU, OF SHEFFIELD, ALABAMA, ASSIGNOR OF ONE-HALF TO PHILIP SCHAU, CHARLES SCHAU, AND DAVID SCHAU, OF KALAMAZOO, MICHIGAN.

TIRE-TIGHTENER.

SPECIFICATION forming part of Letters Patent No. 632,152, dated August 29, 1899.

Application filed September 22, 1898. Serial No. 691,657. (No model.)

*To all whom it may concern:*

Be it known that I, WILLIAM SCHAU, a citizen of the United States, residing at the city of Sheffield, in the county of Colbert and State of Alabama, have invented certain new and useful Improvements in Tire-Tighteners, of which the following is a specification.

This invention relates to improvements in means for tightening or setting the tires of vehicles without removing them from the fellies or wheels. There have been numerous attempts to accomplish this result of which I am aware, and of the machines which I have seen in operation many of them were objectionable, because while they tightened the tire they caused it to wrinkle or "buckle," as the expression is, causing an unevenness in the periphery, and also applied the pressure too strong at one point, which tended to deform the felly. Many of them lack the necessary power to "upset" the metal of the tire and contract it in that way.

The objects of my invention are therefore, first, to provide a simple and efficient tire setting or tightening machine which shall be effective and practical in its operation without deforming or injuring the wheel; second, to provide improved means of guiding the tire so that it can be tightened or set by an endwise compression of the material thereof and entirely relieving the felly of the force necessary to keep the tire from indenting; third, to provide a device which can be readily and easily applied to set the tire without removing the wheel from the vehicle; fourth, to provide improved jaws and means for grasping the tire; fifth, to provide an improved means of adjusting the tire-setting machine to the tire of various-sized wheels. Further objects will definitely appear in the detailed description to follow. I accomplish these objects of my invention by the devices and means described in this specification.

The invention is definitely pointed out in the claims.

The structure is fully illustrated in the accompanying drawings, forming a part of this specification, in which—

Figure 1 is a side elevation of my improved machine in position on a wheel to set the tire. Fig. 2 is a plan view of the structure appearing in Fig. 1. Fig. 3 is a longitudinal sectional detail elevation of the structure, taken on line 3 3 of Fig. 2, the center blocks L and L' being in full lines. Fig. 4 is a transverse enlarged detail sectional elevation taken on line 4 4 of Fig. 1, showing the manner in which the tire is clamped. Fig. 5 is an enlarged detail transverse sectional elevation taken on line 5 5 of Fig. 1, showing the position and relation of one of the eccentrics for actuating the same. Fig. 6 is a detail sectional elevation taken on line 6 6 of Fig. 11. Fig. 7 is a top plan view of one of the plates I. Fig. 8 is an inside elevation of the same, showing the jaws *i* in position. Fig. 9 is an end elevation of the part appearing in Figs. 7 and 8. Fig. 10 is a detail plan view of one of the side pieces B. Fig. 11 is a side elevation of the part B. Fig. 12 is a side elevation of one of the links F. Fig. 13 is a detail sectional elevation taken on line 13 13 of Fig. 14, showing the central adjustable blocks L' L', the block L, and spring-yoke M between blocks L' L' and adjacent parts. Fig. 14 is an inverted plan view of the portions appearing in Fig. 13. Fig. 15 is an enlarged detail elevation of one of the adjusting-yokes H with its thumb-screw H'.

In the drawings all of the sectional views are taken looking in the direction of the little arrows at the end of the section-lines.

Similar letters of reference refer to similar parts throughout the several views.

Referring to the lettered parts of the drawings, A A represent the side pieces of the main supporting-frame, which are of sufficient length to extend outwardly beyond the tire on a suitable segment of an ordinary carriage-wheel, one on each side. Ribs A' A' project to embrace the tire. The side pieces are provided with upwardly or outwardly projecting lugs or fingers G G, which retain the operative parts of the machine in position. A pair of levers C C, oppositely faced, are securely pivoted at *f f* to each side bar A, and through the upper ends of each bar of these levers extends an eccentric E. The said eccentrics are connected on each side by a link D. Suitable shanks E' E' project out at right angles from the body of the eccentric to receive levers E'', which are used to actuate the same and bring the upper ends of the levers C C toward each other with tremendous power. Connected to each of the four levers, two on each side and projecting downwardly into proximity with the lugs G, which hold the same in position, are plates B. These are pivotally connected to the levers C toward their middle portions. A yoke H is pivoted toward each end of the bar A and embraces the upwardly-projecting end of the plates B. Thumb-screws H' H' are provided to depress the ends of the plates to carry the engaging jaws $a$ down into position to engage the tire at each side of the levers. Each plate B is provided with four holes, the function of which will be hereinafter described. The end of each plate B toward the center of the machine is provided with a segmental lug $g$, and a curved lug $h$ is provided opposite the second hole from the end. Links F connect the plates B to the levers C and are provided with recesses $g'$ and $h'$, corresponding to lugs $g$ and $h$ on the plates. The said lugs $g$ and $h$ are in position to engage the corresponding recesses in links F. Bolts $e\ e$, through the plates toward their inner ends, join the levers and plates together, and the lugs serve as guides and to strengthen the parts. The openings $e'$ at each end of the plates are square and positively engage and retain the square bolts inserted through the same. The central openings $e''\ e''$ on each plate B have their vertical walls slightly curved and are wider from the top to bottom than the square bolts which pass through the same. This is for the purpose of permitting the two middle bolts to adjust themselves to allow the jaws to conform to the tire P' on each side. Square bolts $e$ pass through and retain the bars and plates in their correct operative position. The curved lugs $g\ h$, which I have heretofore mentioned, are to engage and retain the links F, which connect these plates to the levers C, as clearly appear in Figs. 5 and 6. The square bolts inserted through the various apertures have keyhole-slots at one end containing keys $e'''$, which serve to put stress on the bolts to tighten the jaws. They are also provided with burs on the opposite end, which can be screwed up for adjusting purposes. The use of keys makes the parts quickly adjustable. On each square bolt is a jaw-piece $a$, which embraces the bolt and has teeth $a'$ on the inner side to engage the edges of the tire. The under side of each square bolt is adapted to rest on top of the tire to guide the same and prevent its kinking or buckling in the operation of the machine. These jaws $a$ are in pairs and are held normally separated by springs $n$, entering into apertures $n'$ within the same, which are oppositely situated.

At the central part of the machine are situated a pair of oppositely-located blocks or plates I, each having a projection or lip $k$ to engage under the tire at that point. A pair of jaws $i$, with teeth thereon, and a lip $i'$, corresponding to the lip $k'$, to project under the tire at this point are also provided on the plate I. (See Figs. 7, 8, and 9.) The jaws are moved outwardly by a suitable light spring $j$, so that their tendency is to separate from each other. Between the plates I are inserted springs $t'$ on little studs or pins $t\ t$ to hold these plates normally and to hold their jaws out of engagement.

Between the plates I are supported a pair of plates L' L', (see Fig. 14,) having upwardly-projecting fingers or shafts $m$. These plates are adapted to slide back and forth on each other, being fitted together with interlapping parts, as appears in Fig. 14. A spring M is connected to each plate by a link $r$ and holds the same normally separated. This device fits between the plates I, and slots J' are just above the upper side of the plate L, through the plate I, on each side to receive a pin J, which is inserted at this point and driven to force the interlapping blocks L' L' into close relation with the outside of the tire, as clearly appears in Fig. 4. A bolt K, with a wing-nut K' thereon, serves to clasp the lower part of the machine together.

In the operation of this machine the keys $e'''$ are loosened and the bolt K is loosened until the machine can be placed down on the outside of a wheel and tire. When this is done, the bolt K is tightened to close the side pieces A A to support and retain the remaining parts of the machine. When this is done, the screws H' are sufficiently tightened to press the engaging jaws $a$ into proper position to take hold of the tire, the set-screws H' having been loosened when the machine is first applied. When this is done, the jaws $a'$ are all tightened by means of the keys $e'''$. When this is done, the key J is driven tight and forces the plates L L down tight on the outside of the central portion of the tire. Tightening the keys by crowding the side pieces B B forces the plates I close up on each side and causes the jaws $i$ to engage. When this is done, the levers E'' are applied to the shanks E' and are forced toward each other, thus drawing the ends of my improved tire-setting machine toward each other, upsetting the tire at the central part and contracting the same onto the felly P. The tire is prevented from depressing by the small lips $k\ k$ and the small lips $i\ i$, which are under the same, and by the plates L' L', which are retained securely to the outside of the tire. By this means the buckling of the tire is prevented, and it is forced to contract in a true circle, and therefore does not harm the felly, and the wheel is left true at the finish.

Having thus described minutely and specifically all the various parts of my machine and their arrangement, I desire to state that there can be very considerable variation in the details of my construction without departing from my invention, and I also desire to state that numerous of the details which I have here shown can be used in other rela- tions and secure the full value and effect of the same.

I desire to state in this connection that the springs $t'$ and $n'$ serve a very useful purpose in keeping the jaws normally open, but that I know by actual experience they can be dispensed with. It will take a little longer to operate the machine, that is all. I also desire to state that the bolts through the machine can be used if they are only provided with screw-plates or with keys, but that the two together are most effective for rapid and efficient use. I also desire to state that the lips $k$ for insertion under the bar, in connection with an outside pressure or guiding plate, might be used in other relations than I have here shown. I also desire to state that the improved means which I have provided, consisting of the movable bolts on the double hinged parts, could also be utilized in other relations for securing the proper fit of the jaws to the bar of the wheel.

Other variations and utilities of other parts in special relations might be specified by me, but I think I have stated enough to make my meaning entirely clear.

Having thus described my invention, what I claim as new, and desire to secure by Letters Patent, is—

1. In a tire-tightener the combination of the side pieces A, with fingers G, thereon; a bolt K, for clamping the pieces A, together on the wheel; a pair of upwardly-projecting levers C, pivoted toward the center of each of said pieces, a link D, above for each pair of levers and eccentrics E, extending through said links with shanks $E'$, thereon for application of an actuating-lever to force the levers C, toward each other, a plate B, for each pair of levers C, a link with suitable bearings to connect said plate B, and lever C, together, bolts $e$, through each pair of plates B, bearing oppositely-facing jaws $a$, supported in a separated position by springs $n$, the yoke H, over the end of each plate B, with thumb-screw $H'$, to adjust the same in relation to the side pieces A, a pair of plates I, at the center having lips $k, k$ to insert under the tire carrying oppositely-situated jaws $i$, separated from each other by means of springs $j$, having lips $i'$, to engage under the tire; plates $L'$, $L'$, to rest on the outside of the tire to retain and guide it in position; the plate L, adapted to receive and guide said plates $L'$, $L'$, so that pressure can be applied to upset the tire $P'$, of a wheel and cause the same to be tightened on its felly, for the purpose specified.

2. In a tire-tightener the combination of suitable side pieces with means of clamping them to a wheel; a pair of oppositely-situated levers on each side piece, links connecting the upper ends of each pair of levers together; eccentric connections between said links and levers, operating-levers to actuate said eccentrics; oppositely-situated jaws secured to the pairs of levers with means of clamping them on the tire so that it may be upset and tightened by the levers.

3. In a tire-tightener the combination of a suitable framework adapted to be secured to a wheel; a pair of levers; a link between said levers; an eccentric to connect said link to at least one of said levers; jaws to engage the tire, carried by said levers; and means of actuating said eccentric to put strong stress on the tire to tighten it.

4. In a tire-tightener the combination of a pair of side pieces; means of securing them to a wheel; oppositely-situated plates adjustably secured to said side plates toward each end; tire-clamping jaws secured to said plates those toward either end being fixed in relation thereto and the intermediate jaws being adjustable so that the jaws can conform to the tire of a wheel; means of drawing said adjustable plates toward each other to tighten the tire for the purpose specified.

5. In a tire-tightener the combination of a suitable frame; opposite members with jaws adapted to clamp the tire; guides to embrace the tire having lips to project between the tire and the felly; and eccentrics connecting the opposite members; and means of actuating the eccentrics for the purpose specified.

6. In a tire-tightener the combination of a suitable frame; plates with clamping-jaws toward each end to grasp the tire; central opposed plates having lips to project under the tire; adjustable lips to project under the tire; adjustable jaws in said plates also carrying lips to insert under the tire; a pair of plates interlapping each other adapted to fit outside the tire; means of holding them close to the tire and means of forcing the jaws from each end toward the center to upset the tire and tighten it at that point.

7. In a tire-tightener the combination of a suitable frame; plates with clamping-jaws toward each end to grasp the tire; central opposed plates having lips to project under the tire; a pair of plates interlapping with each other adapted to fit outside the tire; means of holding them close to the tire and means of forcing the jaws from each end toward the center to upset the tire and tighten it at that point.

In witness whereof I have hereunto set my hand and seal in the presence of two witnesses.

WILLIAM SCHAU. [L. S.]

Witnesses:
E. H. LAWRENCE,
E. E. DOUD.